(12) United States Patent
Kachare et al.

(10) Patent No.: US 11,880,583 B2
(45) Date of Patent: Jan. 23, 2024

(54) SYSTEMS, METHODS, AND DEVICES FOR ATTACHABLE COMPUTE RESOURCES FOR STORAGE DEVICES

(71) Applicant: Samsung Electronics Co., Ltd., Suwon-si (KR)

(72) Inventors: Ramdas P. Kachare, Pleasanton, CA (US); Sungwook Ryu, Palo Alto, CA (US); Yang Seok Ki, Palo Alto, CA (US); Sanghun Jun, San Jose, CA (US); Oscar P. Pinto, San Jose, CA (US); Karnik Shah, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/202,335

(22) Filed: Mar. 15, 2021

(65) Prior Publication Data
US 2022/0083257 A1  Mar. 17, 2022

Related U.S. Application Data

(60) Provisional application No. 63/149,219, filed on Feb. 12, 2021, provisional application No. 63/078,325, filed on Sep. 14, 2020.

(51) Int. Cl.
*G06F 3/06* (2006.01)

(52) U.S. Cl.
CPC .......... *G06F 3/0655* (2013.01); *G06F 3/0625* (2013.01); *G06F 3/0679* (2013.01)

(58) Field of Classification Search
CPC .. G06F 13/4063; G06F 3/0607; G06F 3/0625; G06F 3/0629; G06F 3/0655; G06F 3/0679

USPC .................................................. 711/154, 103
See application file for complete search history.

(56) References Cited

U.S. PATENT DOCUMENTS

| | | |
|---|---|---|
| 8,495,189 B2 | 7/2013 | Branson et al. |
| 10,318,476 B2 | 6/2019 | Slik |
| 10,545,770 B2 | 1/2020 | Chew et al. |
| 10,606,786 B2 | 3/2020 | Fox et al. |
| 2003/0007321 A1* | 1/2003 | Dayley ............... G06F 1/181 361/679.6 |

(Continued)

*Primary Examiner* — Hashem Farrokh
(74) *Attorney, Agent, or Firm* — Renaissance IP Law Group LLP

(57) ABSTRACT

A storage device may include a storage medium, a storage device controller coupled to the storage medium, a host interface coupled to the storage device controller, and an attachable module interface configured to connect an attachable compute module to the storage device controller. The attachable module interface may include a data interface, a side-band interface, and/or a power interface. The attachable module interface may include a connector configured to connect the attachable compute module to the storage device controller. The storage device may include an enclosure having an opening configured to enable the attachable compute module to be connected to the attachable module interface through the opening. The storage device controller may be configured to utilize one or more resources of the attachable compute module. The storage device controller may be configured to communicate with the attachable compute module through one or more command extensions of a storage protocol.

18 Claims, 5 Drawing Sheets

(56) References Cited

U.S. PATENT DOCUMENTS

| | | | | |
|---|---|---|---|---|
| 2003/0030977 A1* | 2/2003 | Garnett | .................. | G06F 1/187 |
| | | | | 361/679.48 |
| 2014/0195710 A1* | 7/2014 | Sasaki | ..................... | G06F 15/17 |
| | | | | 710/302 |
| 2018/0046409 A1* | 2/2018 | Bleikertz | .............. | G06F 3/0659 |
| 2018/0341619 A1* | 11/2018 | Slik | ..................... | G06F 13/4286 |
| 2019/0073148 A1* | 3/2019 | Adrian | ................ | G06F 13/4068 |
| 2020/0389315 A1* | 12/2020 | Dambal | ................ | G06F 21/606 |

* cited by examiner

SYSTEMS, METHODS, AND DEVICES FOR ATTACHABLE COMPUTE RESOURCES FOR STORAGE DEVICES

CROSS-REFERENCE TO RELATED APPLICATIONS

This application claims priority to, and the benefit of, U.S. Provisional Patent Application Ser. No. 63/149,219 titled "Systems, Methods, and Apparatus for Modular Compute Resources for Storage Devices" filed Feb. 12, 2021 which is incorporated by reference, and U.S. Provisional Patent Application Ser. No. 63/078,325 titled "Pluggable Compute Resource Modules for SSD" filed Sep. 14, 2020 which is incorporated by reference

TECHNICAL FIELD

This disclosure relates generally to storage devices, and more specifically to systems, methods, and devices for modular compute resources for storage devices.

BACKGROUND

A storage device may include a storage medium to provide nonvolatile data storage. A computational storage device may include one or more compute resources to enable the storage device to process data at the storage device.

The above information disclosed in this Background section is only for enhancement of understanding of the background of the invention and therefore it may contain information that does not constitute prior art.

SUMMARY

A storage device may include a storage medium, a storage device controller coupled to the storage medium, a host interface coupled to the storage device controller, and an attachable module interface configured to connect an attachable compute module to the storage device controller. The attachable module interface may include a data interface configured to exchange data between the storage device controller and the attachable compute module. The attachable module interface may include a side-band interface. The side-band interface may be configured to identify one or more parameters of the attachable compute module. The attachable module interface may include at least one power connection. The at least one power connection is configured to apply a power limit to the attachable compute module. The attachable module interface may include a connector configured to connect the attachable compute module to the storage device controller. The storage device may include an enclosure having an opening configured to enable the attachable compute module to be connected to the attachable module interface through the opening. The storage device controller may be configured to control a visibility of one or more compute resources of the attachable compute module through the host interface. The storage device controller may be configured to utilize one or more resources of the attachable compute module. The storage device controller may be configured to transfer control of one or more functions of the storage device to the attachable compute module. The storage device controller may be configured to communicate with the attachable compute module through one or more command extensions of a storage protocol. The attachable module interface may be configured to enable the attachable compute module to be detached from the storage device and replaced with a different attachable compute module. The storage device may further include a network interface controller configured to utilize one or more compute resources of the attachable compute module.

A method of operating a storage device may include detecting an attachable compute module connected to an attachable module interface of the storage device, and utilizing one or more compute resources of the attachable compute module based on detecting the attachable compute module. The method may further include identifying the attachable compute module through the attachable module interface. The method may further include transferring control of one or more functions of the storage device to the attachable compute module. The method may further include communicating with the attachable compute module through one or more command extensions of a storage protocol.

A system may include a storage device comprising a storage medium, a storage device controller coupled to the storage medium, a host interface coupled to the storage device controller, and an attachable module interface coupled to the storage device controller, and an attachable compute module connected to the attachable module interface. The attachable compute module may include an identification data structure configured to be read by the storage device controller.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figure 1:
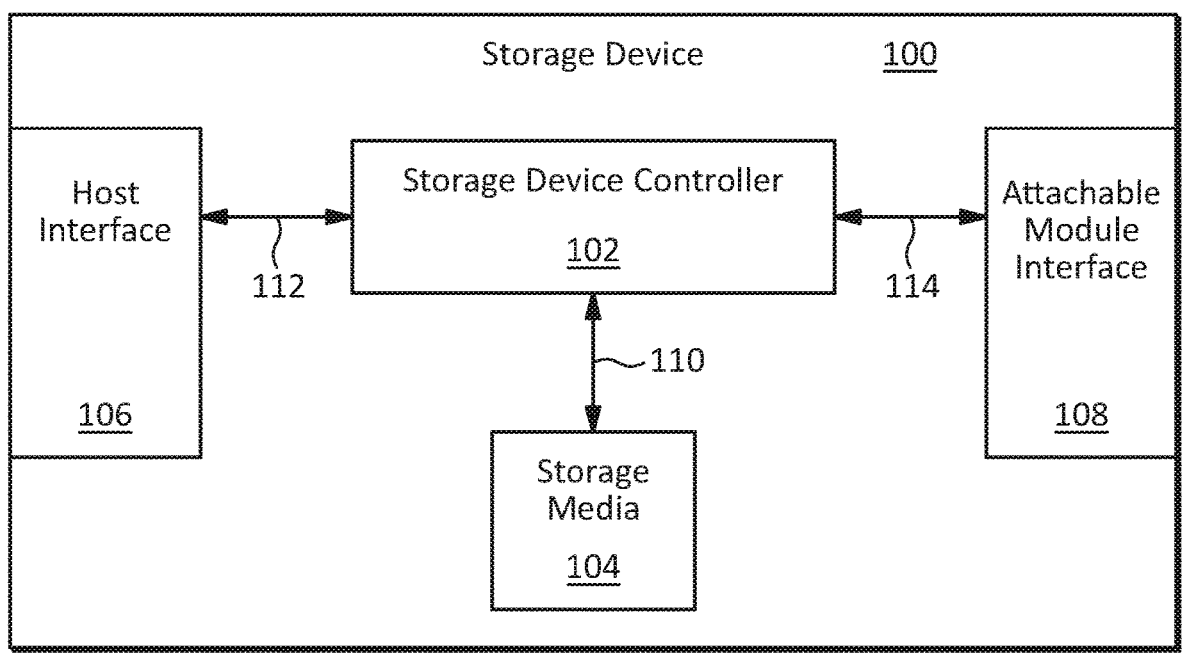
FIG. 1 illustrates an embodiment of an architecture for a storage device in accordance with example embodiments of the disclosure.

In data processing systems in accordance with example embodiments of the disclosure, data may be stored in storage devices such as hard disk drives (HDDs), solid state drives (SSDs), and/or the like, which may include storage media to provide nonvolatile data storage. Data stored in the storage devices may be transferred to a central processing unit (CPU) for processing. The results from the data processing may then be transferred back to the storage devices. However, processing large amounts of data in a central manner may cause delays associated with moving data between storage devices and a CPU. It may also consume resources such as CPU cycles, memory bandwidth, network bandwidth, power, and/or the like.

To reduce the time and/or costs associated with centralized data processing, computational storage devices in accordance with example embodiments of the disclosure may include compute resources to enable the storage devices to process data directly at the storage devices rather than sending the data to a centralized processor. Computational storage devices may be used for a wide variety of applications such as graph processing, scientific calculations, video processing, artificial intelligence, machine learning, social networks, and/or the like. Different applications may involve the use of different types and/or amounts of compute resources, so a storage device with a single configuration of compute resources may not be able to provide optimal or even adequate resources for all potential applications. Therefore, different computational storage devices may be designed and manufactured for different applications.

However, designing and/or manufacturing a large number of different computational storage devices for different applications may increase the cost to manufacture each device, as well as the cost and/or complexity of systems for the design, distribution, support, and/or the like, of the devices.

In some embodiments, an architecture for a computational storage device in accordance with example embodiments of the disclosure may enable a modular compute resource to be attached to a storage device. Depending on the implementation details, this may enable one or a small number of base storage devices to be adapted for use in a wide variety of applications by attaching a modular compute resource that may be specialized and/or optimized for each application. For example, in some embodiments, a pluggable compute module may be inserted into a slot, connector, and/or the like on a storage device. Some embodiments may support multiple pluggable compute modules in the storage device.

In some implementations, a modular architecture for a computational storage device in accordance with example embodiments of the disclosure may reduce the cost of each storage device, for example, by improving the economies of scale for the design, manufacture, distribution, support, and/or the like, of a single or small number of base storage devices. Moreover, depending on the implementation details, it may enable the development of an ecosystem in which participants may utilize their individual expertise to create compute modules that may enable a computational storage device to operate in a large variety of applications.

In some embodiments, a storage device may include an enclosure, which may be implemented, for example, as a case, having an opening configured to enable the attachable compute module to be connected to, inserted in, and/or the like, the attachable module interface through the opening. A storage device controller may be configured to transfer control of one or more functions, such as data processing functions, of the storage device to the attachable compute module. A storage device controller may be configured to communicate with the attachable compute module through one or more command extensions of a storage protocol, by utilizing a proprietary communication protocol, and/or the like. A method may include transferring control of one or more functions, such as data processing functions, of the storage device to an attachable compute module. In some embodiments, an attachable compute module may include a control and/or status data structure configured to be read and/or written by a storage device controller.

A computational storage device that may have a modular compute resource attached in accordance with example embodiments of the disclosure may be implemented with a wide variety of different physical and/or electrical configurations, interfaces, protocols, features, and/or the like as described in more detail below.

Architecture

FIG. 1 illustrates an embodiment of an architecture for a storage device in accordance with example embodiments of the disclosure. The storage device 100 illustrated in FIG. 1 may include a storage device controller 102, a storage medium 104, a host interface 106, and an attachable module interface 108. The storage medium 104, host interface 106, and attachable module interface 108 may be coupled to the storage device controller 102 through connections 110, 112, and 114, respectively.

The attachable module interface 108 may be configured to connect an attachable compute module to the storage device controller 102. The attachable module interface 108 may provide mechanical connections, electrical connections, and/or the like to an attachable compute module. For example, in some embodiments, the attachable module interface 108 may provide a mechanical connection between an attachable compute module and the storage device 100, and one or more power and/or signal connections such as electrical connections between the attachable compute module and the storage device controller 102. Although only one attachable module interface 108 is illustrated in FIG. 1, any number of additional attachable module interfaces 108 may be included to connect any number of attachable compute modules to the storage device controller 102.

The attachable module interface 108 may be implemented in any detachable or non-detachable form including connectors such as pin-and-sleeve connectors, spring-terminal connectors, printed circuit board (PCB) headers, card-edge connectors, plugs, sockets, and/or the like, attachment sites such as a pattern of solder pads, a pattern of spring loaded pins, and/or the like arranged to engage a corresponding pattern of terminals on the attachable compute module, a wireless coupling site, and/or the like. Power and/or signal connections may be wired, for example, through contacting terminals, solder connections, and/or the like, or wireless, for example, through radio frequency (RF) connections, optical connections, ultrasonic connections, and/or the like.

The storage device 100 and storage media 104 may be implemented with any type of storage apparatus and associated storage media including HDDs which may include magnetic media, SSDs which may include solid state media such as not-AND (NAND) flash memory, optical drives, drives based on any type of persistent memory such as cross-gridded nonvolatile memory, memory with bulk resistance change, and/or the like, and/or any combination thereof. The storage media 104 may be connected to the storage device controller 102 through any suitable interface 110, for example, Toggle or Open NAND Flash Interface (ONFI) in the case of NAND storage media. The storage device may be implemented with any form factor 3.5 inch, 2.5 inch, 1.8 inch, M.2, Enterprise and Data Center SSD Form Factor (EDSFF), NF1, and/or the like.

The host interface 106 may be implemented with any connector configuration such as Serial ATA (SATA), Small Computer System Interface (SCSI), Serial Attached SCSI (SAS), U.2, U.3, and/or the like, and using any protocol for the one or more connections 112 such as Peripheral Component Interconnect (PCI), PCI express (PCIe), Nonvolatile Memory Express (NVMe), NVMe-over-Fabrics (NVMe-oF), Ethernet, InfiniBand, Fibre Channel, and/or the like.

The storage device controller 102 may include logic to implement any operational functionality of a storage device as well as any functionality to detect the presence of and/or interface to an attachable compute module through the attachable module interface 108, and/or to utilize any compute resources of the attachable compute module. The storage device controller 102 may be implemented with hardware, software, or any combination thereof, including combinational logic, sequential logic, one or more timers, counters, registers, state machines, complex programmable logic devices (CPLDs), field programmable gate arrays (FPGAs), application specific integrated circuits (ASICs), complex instruction set computer (CISC) processors and/or reduced instruction set computer (RISC) processors, and/or the like executing instructions stored in volatile memories such as dynamic random access memory (DRAM) and/or static random access memory (SRAM), nonvolatile memory such as flash memory and/or the like, as well as graphics processing units (GPUs), neural processing units (NPUs), tensor processing units (TPUs), and/or the like.

The one or more connections 114 between the attachable module interface 108 and the storage device controller 102 may include one or more power connections, data connections, side-band connections, and/or the like. Some examples may include PCIe, Ethernet, double data rate (DDR), DDR2, DDR3, DDR4, DDR5, Toggle, ONFI, Transmission Control Protocol/Internet Protocol (TCP/IP), InfiniBand, remote direct memory access (RDMA), Compute Express Link (CXL), Gen-Z, general-purpose input/output (GPIO), Inter-Integrated Circuit (I2C), System Management Bus (SMBus), and/or the like.

Implementation

Figure 2:
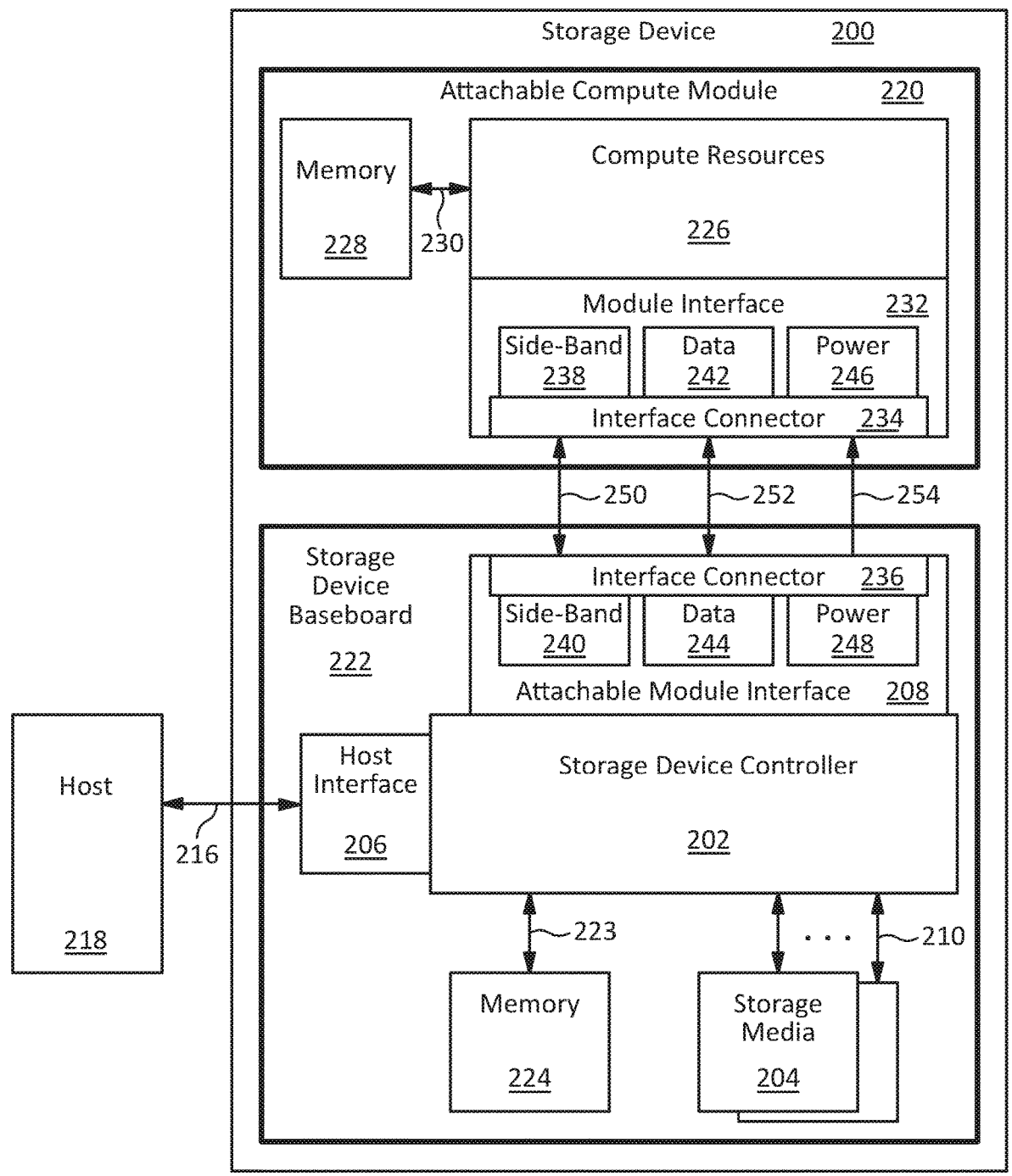
FIG. 2 illustrates an example embodiment of a storage device including an attachable compute module in accordance with example embodiments of the disclosure.

FIG. 2 illustrates an example embodiment of a storage device including an attachable compute module in accordance with example embodiments of the disclosure. The embodiment illustrated in FIG. 2 may be used, for example, to implement the architecture illustrated in FIG. 1, however, the principles are not limited to the details illustrated in FIG. 2.

The storage device 200 illustrated in FIG. 2 may include a storage device controller 202, storage media 204, a host interface 206, an attachable module interface 208, and an attachable compute module 220. The storage device 200 may further include a circuit board 222 (which may also be referred to as a storage device baseboard) on which the storage device controller 202, storage media 204, and host interface 206 may be located. The storage media 204 may be connected to the storage device controller 202 through any suitable storage media interface 210 such as Toggle or ONFI in the case of NAND storage media. The storage device baseboard 222 may further include a memory 224 which may be implemented with any suitable type of memory such as DRAM, SRAM, nonvolatile memory, and/or the like and connected to the storage device controller 202 through any suitable interface 223 such as DDR, DDR2, . . . , and/or the like if the memory 224 is implemented with DRAM.

The host interface 206 may connect the storage device 200 to a host 218 through a connection 216 using any storage interface and/or protocol such as PCIe, NVMe, NVMe-oF, Ethernet, InfiniBand, Fibre Channel, and/or the like.

The storage device controller 202 may include logic to implement any operational functionality of a storage device such as a flash translation layer (FTL) in an embodiment in which the storage media 204 may be implemented with flash memory. The storage device controller 202 may include logic to implement any functionality to interface the attachable compute module 220 through the attachable module interface 208, and/or to utilize any compute resources of the attachable compute module 220 as described below. The storage device controller 202 may be implemented with hardware, software, or any combination thereof, including combinational logic, sequential logic, one or more timers, counters, registers, state machines, CPLDs, FPGAs, ASICs, CISC and/or RISC processors, and/or the like executing instructions stored in DRAM, SRAM flash memory and/or the like, as well as any other types of processing units.

The attachable compute module 220 may include any type and/or number of compute resources 226 such as FPGAs, ASICs, CISC and/or RISC CPUs, x86 processors, ARM processors, GPUs, NPUs, TPUs, CPLDs, discrete combinational logic and/or sequential logic, and/or the like, in any suitable form including integrated circuits, systems on chips (SoCs), and/or the like. The attachable compute module 220 may also include memory 228 such as DRAM, SRAM, nonvolatile memory, and/or the like connected to the compute resources 226 through any suitable interface 230. The compute resources 226 may further include logic to implement any additional functionality of the attachable compute module 220 such as interface functionality, control functionality, and/or the like as described below.

The attachable compute module 220 may further include a module Interface 232 to provide mechanical connections, electrical connections, and/or the like to the attachable module interface 208. For example, in the embodiment illustrated in FIG. 2, the module Interface 232 may include a connector 234 that may provide mechanical and electrical connections to a corresponding connector 236 of the attachable module interface 208.

The interfaces 232 and 208 may include side-band interfaces 238 and 240, respectively, data interfaces 242 and 244, respectively, and power interfaces 246 and 248, respectively.

The side-band interfaces 238 and 240 may provide management and/or control functionality in one or two directions through one or more side-band connections 250. The side-band interfaces 238 and 240 may use any suitable interface such as GPIO, I2C, SMBus, PCIe, and/or the like. Management and/or control functionality may be implemented, for example, using a global control data structure that may specify management and/or control functionality such as power limits, module enable and/or disable, module reset, module identification and/or functionality signaling, clock signals, error notifications, alarms, and/or the like.

The attachable compute module 220 and storage device controller 202 may use an identification data structure that may be read by the storage device controller 202, for example, through the one or more side-band connections 250. The identification data structure may include information about the attachable compute module 220 such as a vendor identification (ID), revision ID, a unique ID, capabilities, features, and/or the like.

The data interfaces 242 and 244 may transmit data, commands, addresses, and/or the like through one or more data connections 252 to enable the storage device 200 to utilize the compute resources 226. The data interfaces 242 and 244 may use any suitable interconnect interface and/or protocol such as PCIe, Ethernet, CXL, GenZ, and/or the like, using any data widths, speeds, and/or the like that may be determined by the storage device controller 202 and/or negotiated with the attachable compute module 220.

In some embodiments, the host 218 and/or storage device controller 202 may exchange data, commands, addresses, and/or the like with the attachable compute module 220 using one or more extensions to an existing protocol. For example, in some embodiments, the host 218 may use the NVMe protocol to send computational storage commands to the storage device 200. The storage device controller 202 may then manage the appropriate computational storage data and control interface with the compute resources 226 using, for example, one or more NVMe command extensions.

In some embodiments, the storage device controller 202 may control the visibility of the attachable compute module 220 and/or compute resources 226 to the host 218. For example, in some implementations, the compute resources 226 may not be directly visible to the host 218. In some other implementations, the storage device controller 202 may expose some or all details of the type and/or number of compute resources 226 to the host 218.

In some embodiments, the storage device controller 202 may operate as a master processor, and the compute resources 226 may operate as a subservient processor or co-processor. In some embodiments, the storage device controller 202 may be configured to relinquish control of one or more functions of the storage device 200 to the attachable compute module 220. For example, by reading the capabilities and/or features of the attachable compute module 220 through the identification data structure, the storage device controller 202 may determine that the attachable compute module 220 is capable of controlling the storage device 200. The storage device controller 202 may then transfer control of one or more functions of the storage device controller 202 to the attachable compute module 220. In such a configuration, some or all resources of the storage device controller 202 may operate as a subservient processor or co-processor to the attachable compute module 220.

The power interfaces 246 and 248 may enable the storage device 200 to provide operating power to the attachable compute module 220, for example, through one or more hardwired connections 254. The storage device 200 may provide operating power to the attachable compute module 220, for example, at voltages and/or currents that may be specified in advance, determined dynamically at runtime, based on requests through the side-band interface, subject to specified power limits, and/or the like.

In some embodiments, a designer and/or manufacture of the storage device 200 may establish a specification for any aspects of the attachable compute module 220 including a mechanical interface, electrical interface, data interface, power interface, side-band interface, identification data structure, global control data structure, and/or the like, which customers, third parties, and/or the like may then use to provide compliant attachable compute modules 220 that may operate correctly with the storage device 200.

The attachable compute module 220 may be implemented in any physical configuration such as a daughter board, a partially or fully enclosed module, an integrated circuit, an SoC, and/or the like, that may be attached to the storage device baseboard 222 through a card edge connector, header, plug and socket connector, solder pad connections, and/or the like.

In some embodiments, the attachable compute module 220 may be attached to the storage device baseboard 222 through a slot in an enclosure, which may be implemented, for example, as a case, of the storage device 200, for example, using a connector on the attachable compute module 220 that may connect to a corresponding socket on the storage device baseboard 222. In some embodiments, the attachable module interface 208 may be configured to enable the attachable compute module 220 to be detached from the storage device 200 and replaced with a different attachable compute module.

In some other embodiments, the attachable compute module 220 may be entirely enclosed within a case of the storage device 200. For example, a manufacturer of the storage device 200 may send completed storage device baseboard assemblies 222, with or without cases, to a customer. The customer may then remove part or all of the cases to attach the attachable compute modules 220 to the storage device baseboards 222 and then replace the cases. Alternatively, the customer may provide their own cases for the storage devices 200.

Although some components may be illustrated in FIG. 2 as individual components, in some embodiments, some components shown separately may be integrated into single components, and/or some components shown as single components may be implemented with multiple components. Moreover, the functionality described with respect to certain components, but may be interchangeable with other components. For example, in some embodiments, control and/or management information illustrated as passing through the side-band connections 250 may instead pass through the data connections 252.

Figure 3:
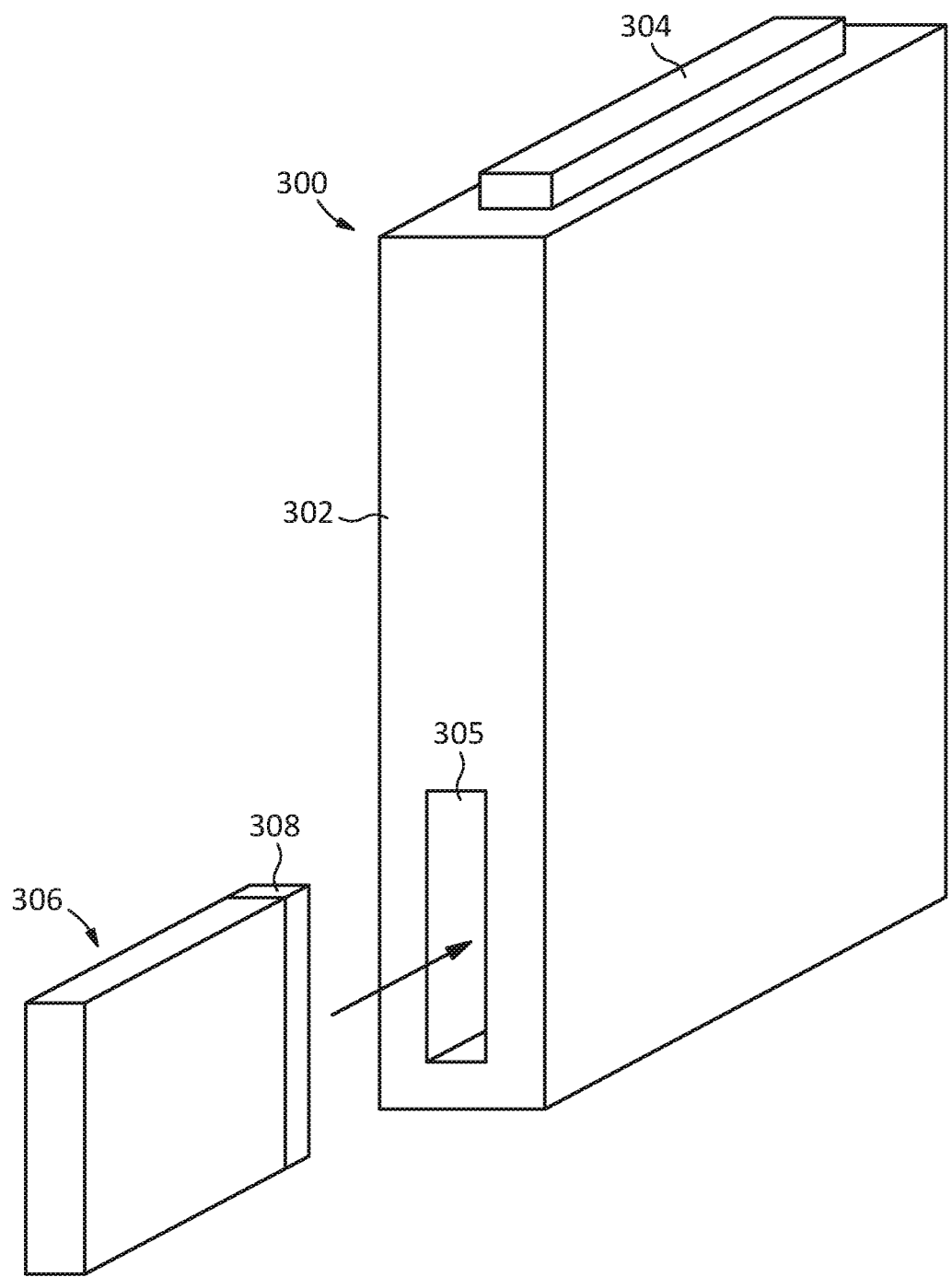
FIG. 3 illustrates an example embodiment of a physical configuration of a storage device and an attachable compute module in accordance with example embodiments of the disclosure.

FIG. 3 illustrates an example embodiment of a physical configuration of a storage device and an attachable compute module in accordance with example embodiments of the disclosure. The storage device 300 illustrated in FIG. 3 may include a case 302 having an opening for a host connector 304. The host connector may be implemented with any storage device connector including SATA, SAS, M.2, U.2, U.3, NF1, and/or the like.

The case 302 may further include a slot 305 configured to receive an attachable compute module 306. The attachable compute module 306 may include a connector 308 such as a card edge connector, pin-and-sleeve connector, header, and/or the like, configured to connect the attachable compute module 306 to a corresponding connector on a storage device baseboard located within the case 302.

Although only one slot 305 and attachable compute module 306 may be illustrated in FIG. 3, any number of additional slots 305 may be included on any location on the case 302 to accommodate additional attachable compute modules 306.

Integrated Functionality

In some embodiments, a storage device having an attachable module interface may also include additional functionality in accordance with example embodiments of the disclosure. For example, in some embodiments, an additional apparatus that may utilize the compute resources of an attachable compute module may be integrated into the storage device.

Figure 4:
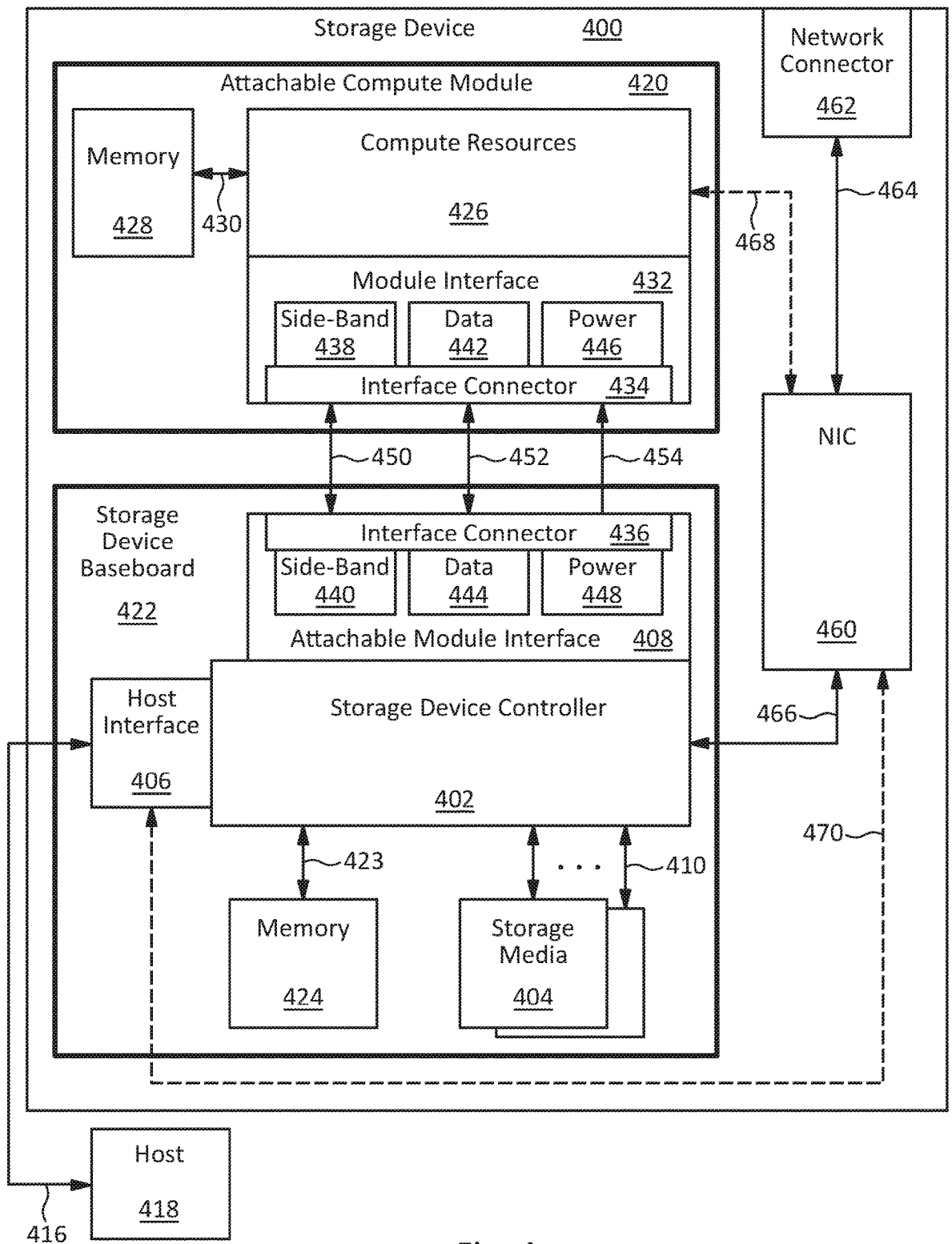
FIG. 4 illustrates an example embodiment of a storage device having an attachable module interface and an integrated network interface controller (NIC) in accordance with example embodiments of the disclosure.

FIG. 4 illustrates an example embodiment of a storage device having an attachable module interface and an integrated network interface controller (NIC) in accordance with example embodiments of the disclosure. The embodiment illustrated in FIG. 4 may include some components similar to those illustrated in FIG. 2. However, the storage device 400 illustrated in FIG. 4 may further include a NIC 460 configured to provide the storage device 400 with access to a network through one or more network connectors 462. The NIC 460 may use any network interface and/or protocol such as Ethernet, TCP/IP, InfiniBand, Fibre Channel, RDMA over converged Ethernet (RoCE), and/or the like, as well as any interconnect interface and/or protocol such as PCIe, RDMA, Compute Express Link (CXL), Gen-Z, and/or the like.

The NIC 460 may be configured to access the compute resources 426 of the attachable compute module 420 through an interface 466 to the storage device controller 402. The interface 466 may be implemented with any suitable interconnect and/or network interface and/or protocol including any of those mentioned above. Alternatively, or additionally, the NIC 460 may be configured to access the compute resources 426 of the attachable compute module 420 directly through an interface 468, which may also be implemented using any suitable interconnect and/or network interface and/or protocol including any of those mentioned above.

In some embodiments, the NIC 460 may be configured to access the host interface 406 through the storage device controller 402. Alternatively, or additionally, the NIC 460 may be configured to access the host interface 406 directly through an interface 470, which may also be implemented using any suitable interconnect and/or network interface and/or protocol including any of those mentioned above.

In some embodiments, the NIC 460 may be configured to use some or all of the compute resources 426 of the attachable compute module 420 to function as a computational NIC, which may receive offloaded compute tasks from the host 418 and/or any other devices connected to the one or more network connectors 462. In some embodiments, the storage device 400 may function primarily as a network interface adapter, with the NIC 460 using more of the compute resources 426 of the attachable compute module 420 than the storage device controller 402.

ADDITIONAL EMBODIMENTS

Figure 5:
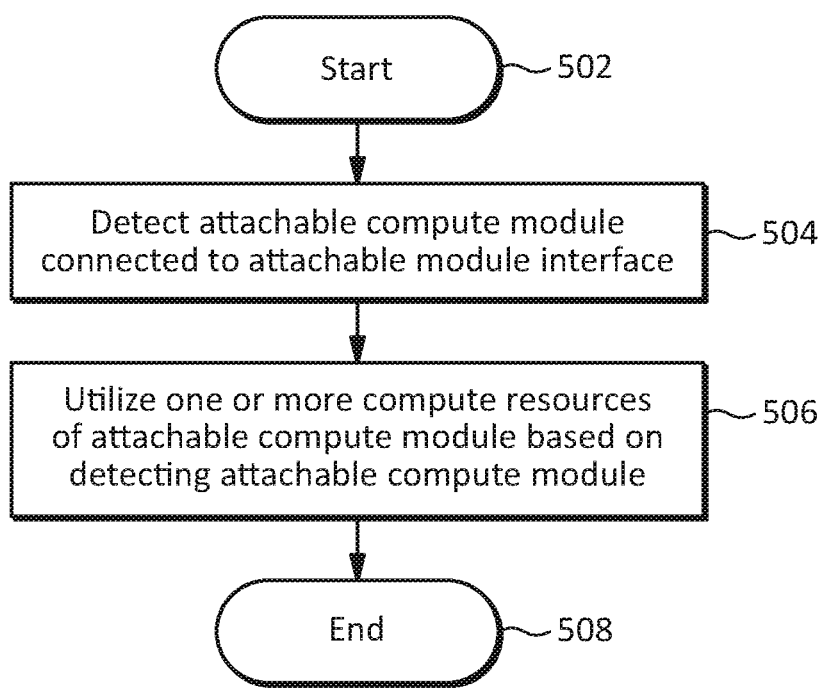
FIG. 5 illustrates an embodiment of a method of operating a storage device in accordance with example embodiments of the disclosure.

FIG. 5 illustrates an embodiment of a method of operating a storage device in accordance with example embodiments of the disclosure. The method may begin at operation 502. At operation 504, the method may detect an attachable compute module connected to an attachable module interface of the storage device. At operation 506, the method may utilize one or more compute resources of the attachable compute module based on detecting the attachable compute module. The method may end at operation 508.

The operations and/or components described with respect to the embodiment illustrated in FIG. 5, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more sub blocks. The use of terms such as "first" and "second" in this disclosure and the claims may only be for purposes of distinguishing the things they modify and may not indicate any spatial or temporal order unless apparent otherwise from context. In some embodiments, based on" may refer to "based at least in part on." A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. An apparatus comprising:
  a storage device comprising:
    a storage medium;
    a storage device controller coupled to the storage medium;
    a storage device connector configured to couple the storage device to a host;
    a host interface coupled between the storage device connector and the storage device controller;
    an attachable module interface configured to connect an attachable compute module to the storage device controller; and
    a module interface connector coupled to the attachable module interface, wherein the storage device controller is configured to transfer control of one or more functions of the storage device to the attachable compute module.

2. The apparatus of claim 1, wherein the attachable module interface comprises a data interface configured to exchange data between the storage device controller and the attachable compute module.

3. The apparatus of claim 1, wherein the attachable module interface comprises a side-band interface.

4. The apparatus of claim 3, wherein the side-band interface is configured to identify one or more parameters of the attachable compute module.

5. The apparatus of claim 1, wherein the attachable module interface comprises at least one power connection.

6. The apparatus of claim 5, wherein the at least one power connection is configured to apply a power limit to the attachable compute module.

7. The apparatus of claim 1, wherein the module interface connector is configured to connect the attachable compute module to the storage device controller.

8. The apparatus of claim 1, wherein the storage device comprises an enclosure having an opening configured to enable the attachable compute module to be connected to the attachable module interface through the opening.

9. The apparatus of claim 1, wherein the storage device controller is configured to control a visibility of one or more compute resources of the attachable compute module through the host interface.

10. The apparatus of claim 1, wherein the storage device controller is configured to utilize one or more resources of the attachable compute module.

11. The apparatus of claim 1, wherein the storage device controller is configured to communicate with the attachable compute module through one or more command extensions of a storage protocol.

12. The apparatus of claim 1, wherein the attachable module interface is configured to enable the attachable compute module to be detached from the storage device and replaced with a different attachable compute module.

13. The apparatus of claim 1, further comprising a network interface controller configured to utilize one or more compute resources of the attachable compute module.

14. A method comprising:
  detecting an attachable compute module connected to an attachable module interface of a storage device, wherein the storage device comprises a storage medium, a storage device controller coupled to the storage medium, a storage device connector configured to couple the storage device to a host, a host interface coupled between the storage device connector and the storage device controller, and a module interface connector coupled to the attachable module interface; and
  using one or more compute resources of the attachable compute module based on detecting the attachable compute module, wherein the storage device controller is configured to transfer control of one or more functions of the storage device to the attachable compute module.

15. The method of claim 14, further comprising identifying the attachable compute module through the attachable module interface.

16. The method of claim 14, further comprising communicating with the attachable compute module through one or more command extensions of a storage protocol.

17. A system comprising:
  a storage device comprising:
    a storage medium;
    a storage device controller coupled to the storage medium;
    a storage device connector configured to couple the storage device to a host;
    a host interface coupled between the storage device connector and the storage device controller;
    an attachable module interface coupled to the storage device controller; and
    an attachable compute module connected to the attachable module interface, wherein the storage device controller is configured to transfer control of one or more functions of the storage device to the attachable compute module.

18. The system of claim 17, wherein the attachable compute module comprises an identification data structure configured to be read by the storage device controller.

* * * * *